2,881,459
Patented Apr. 14, 1959

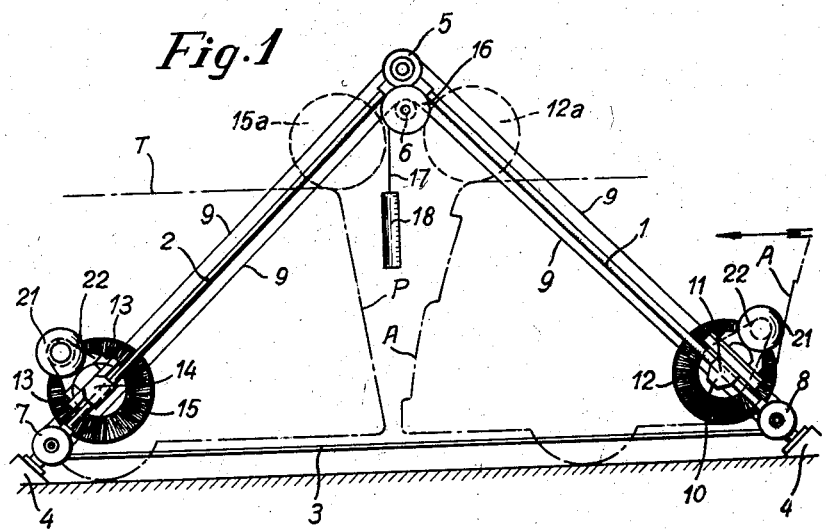
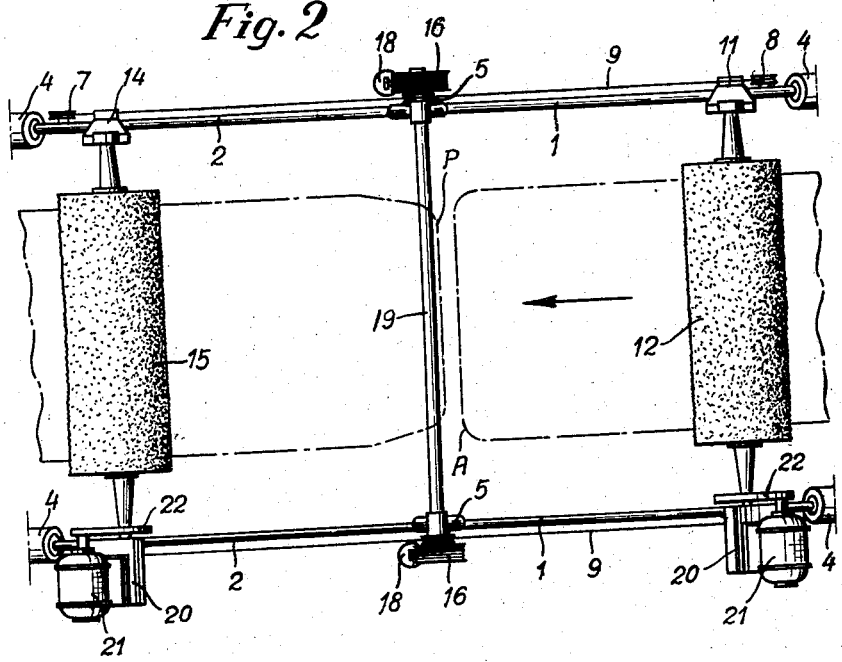

2,881,459
WASHING PLANTS FOR AUTOMOTIVE VEHICLES

Roberto Emanuel, Turin, Italy, assignor to Soc. ACC. Emanuel di G. e R. Emanuel & C., Turin, Italy Application November 13, 1956, Serial No. 621,965

Claims priority, application Italy November 10, 1955

2 Claims. (Cl. 15—21)

This invention relates to a plant for washing the fore and rear ends of vehicles, more particularly motor busses.

The improved plant chiefly comprises two rotary brushes guided on oppositely inclined guides interconnected to move up and down simultaneously along the guides by the effect of the forward movement of the vehicle, thereby washing the fore and rear ends of the vehicle.

According to one embodiment of this invention the guides are in the form of a framework comprising a pair of triangular frames arranged with their apexes at the top.

The apparatus consists of a pair of closed rope loops travelling over pulleys arranged at the apexes of the frames.

Further characteristic features of this invention will be understood from the appended detailed description referring to the accompanying drawing, wherein Figures 1 and 2 diagrammatically show in side-elevational view and in plan-view, respectively, an embodiment of the improved washing plant.

The framework of this plant comprises two identical upstanding frames in the shape of isosceles triangles, the sides of which are formed by tubular beams 1, 2, the base of each triangle being in the form of a brace 3.

The two frames are anchored to the floor at their lower corners by means of blocks 4 and are interconnected at their top apexes by means of a cross member 19, the two frames being transversely aligned and parallel with each other.

The beams 1 and 2 of the frames form, by pairs, inclined guides over which slides 11, 14, respectively are movable, the said slides carrying the ends of the supporting shafts of counter-rotating brushes 12, 15, respectively.

The slides 11, 14 carrying the two brushes are interconnected by a pair of high-strength metal ropes 9. The ropes travel over pulleys 5, 6 and 7, 8 arranged at the top and bottom apexes of the framework, respectively. The ropes 9 are attached at 10 and 13 to the slides 11 and 14, respectively, whereby each rope is of endless loop form. The rope runs are attached to the slides to cause the two brushes to move upward and downward simultaneously.

Two drums 16 are splined to the ends of the shaft carrying the pulleys 6, ropes 17 being wound up on said drums and carrying each at its free end a counterweight 18 adapted to part-balance the weight of the brushes and apply an operating pressure thereto.

The slides 11 and 14 each carry a foundation plate 20 for an electric motor 21 driving its respective brush through a speed-reducing belt drive 22.

In operation, a vehicle is moved forward between the two frames in the direction of the arrow. As its fore end A abuts the brush 12 in its lower position, the brush 12 is moved upward along the guides 1 on the framework to its upper position 12a. As the brush is simultaneously rotated by the motor 21, its combined movements wash the vehicle fore end A. At the same time the brush 15 is moved upward due to its interconnection with the brush 12 through the ropes 9 to its upper position 15a. On further forward movement of the vehicle both brushes wash the roof T. As the brush 15 reaches beyond the roof, it moves down along the guides 2 on the framework, thereby washing the rear end P of the vehicle.

In order to minimize friction on the guides the slides 11 and 14 are guided thereon by means of rollers mounted on antifriction bearings.

It will be understood that constructional details and embodiments can be varied with respect to the example described and shown without departing from the scope of this invention.

What I claim is:

1. In a vehicle washing plant, a pair of identical parallel upstanding triangular frames which are transversely spaced from each other to provide a passageway therebetween for a vehicle to be washed, each including two upwardly converging guide beams, a slide on each beam movable lengthwise thereof, a brush rotatably supported at its opposite ends from the slides movable on two transversely opposite beams, a second brush rotatably supported at its ends from the slides movable on the two remaining transversely opposite beams, means interconnecting the slides for a unison translational movement of the brushes lengthwise of the respective beams, the said means comprising a pair of pulleys rotatably supported from each frame at its apex zone, a pulley rotatable at each lower corner of each frame, and an endless rope traveling on the pulleys of each frame having its opposite runs anchored respectively to the two slides on the frame, and means associated with the brushes for rotating the latter during operation.

2. In a vehicle washing plant a pair of identical parallel frames upstanding from the ground, transversely spaced from each other to provide a passageway therebetween for a vehicle to be washed, each including two upwardly converging guide beams, said frames forming each an isosceles triangle the sides of which are formed by said upwardly converging beams, a slide on each beam movable lengthwise thereof, a brush rotatably supported at its opposite ends from the slides movable on two transversely opposite beams, a second brush rotatably supported at its ends from the slides movable on the two remaining transversely opposite beams, a pair of pulleys rotatably supported from each frame at its apex zone, a pulley rotatable at each lower corner zone of each frame, an endless rope traveling on the pulleys of each frame, an endless rope traveling on the pulleys of each frame having its opposite runs anchored respectively to the two slides on the frame thereby interconnecting the slides for a unison translational movement of the brushes, a drum connected to rotate fast with one pulley of the said pair of pulleys on each frame, a rope wound on the drum, a weight depending from one end of the last named rope counterweighing the brushes, and means associated with the brushes for rotating the latter in operation.

References Cited in the file of this patent

UNITED STATES PATENTS

| | | |
|---|---|---|
| 1,887,571 | Wilson | Nov. 15, 1932 |
| 1,932,192 | Smith | Oct. 24, 1933 |
| 1,942,653 | Kiggins | Jan. 9, 1934 |

FOREIGN PATENTS

| | | |
|---|---|---|
| 522,641 | Belgium | Sept. 30, 1953 |